J. P. THOMPSON.
ADJUSTABLE DRAFT-BARS FOR CUTTERS.
No. 171,064. Patented Dec. 14, 1875.
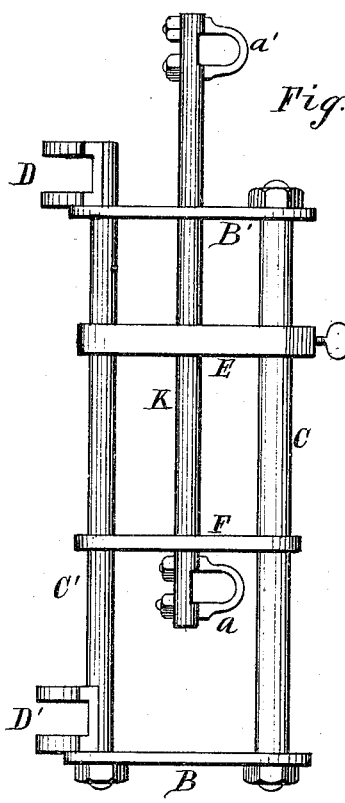
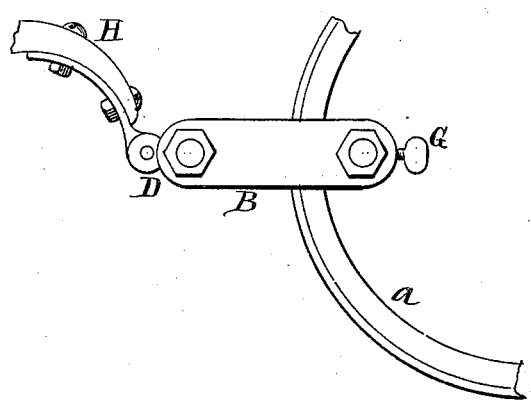
Witnesses:
John F. Bruce
De Forest Crandall
Inventor:
James P. Thompson
Per Larkin & Bottum
Att'ys

UNITED STATES PATENT OFFICE.

JAMES P. THOMPSON, OF MILWAUKEE, WISCONSIN.

IMPROVEMENT IN ADJUSTABLE DRAFT-BARS FOR CUTTERS.

Specification forming part of Letters Patent No. 171,064, dated December 14, 1875; application filed April 27, 1875.

*To all whom it may concern:*

Be it known that I, JAMES P. THOMPSON, of the city of Milwaukee, in the county of Milwaukee and State of Wisconsin, have invented certain new and useful Improvements in an Adjustable Draft-Bar for Cutters; and I do hereby declare that the following is a full, clear, and exact description thereof, which will enable others skilled in the art to which it pertains to make and use the same, reference being had to the accompanying drawing, and to the letters of reference marked thereon, which form a part of this specification.

The object of my invention is to provide an adjustable draft-bar for single cutters or sleighs permitting the horse to travel directly in front of the center of the vehicle or in front of one of the runners, and to permit a ready change from one position to the other.

It is well known that in traveling in winter with a single horse it is desirable often times to have the horse travel in the runner-track, and the foot-tracks of double teams. But whenever the road is uniformly smooth the draft should be, and the horse should travel, directly in front of the center of resistance, or in front of a point midway between the two runners, and changes in the roadway, as, for instance, from city or village travel to country roads, necessitates a change in draft.

Figure 1 is a representation of my improved draft-bar, represented detached from the cutter. Fig. 2 is an end view of the same, showing also the position of the runners.

Similar letters denote similar parts.

K is a rod of iron or other suitable material attached at its two extremities to the sleigh-runners A A, in the position shown in Fig. 2, by means of clips or other suitable device. C C' are two parallel rods of any suitable material, which are rigidly connected at the extremities of each by the cross-bars B and B'. At the extremities of C' the thills may be attached by the shaft-clips D D', or other suitable means, as shown at H. E and F are cross-bars rigidly attached to the rod K at their centers, but allowing the rods C and C' to slide freely through holes in their extremities in the position shown. Through the center of B' the rod K freely slides.

It will be seen that the rectangular frame formed by C, C', B, and B' will slide freely through a limited space upon the rod K, and through the holes in the ends of E and F, which act as guides and supports.

G is a thumb-screw in the end of E, which clamps this frame securely in any desired position. The limits of the space through which this frame can slide is the distance from A' to E, which should equal or exceed one-half the distance between the runners.

Whenever it is desired to change the relative positions of horse and cutter it is only necessary to loosen the thumb-screw G, adjust the thills to the proper position, and fasten them there by means of the thumb-screw G.

It is obvious that the bar might be made to be adjustable to the center and both sides, but in practice few or none would be made adjustable to more than the center and one side.

I therefore claim as my invention—

The combination of the rod K, attached at its two extremities to the runners of a sleigh or cutter, and having rigidly attached to it the cross-piece E and the bars C and C', provided with the eyes D and D', which cross-pieces are connected at their extremities by cross-pieces B and B' sliding at their centers upon cross-bar K.

In testimony that I claim the foregoing as my own I affix my signature in presence of two witnesses.

JAMES P. THOMPSON.

Witnesses:
E. H. BOTTUM,
DEFOREST CRANDALL.